May 10, 1966    W. J. SHIMANCKAS    3,250,350
SINGLE LEVER CONTROL FOR CLUTCH AND MOTOR
Filed April 30, 1964    2 Sheets-Sheet 1
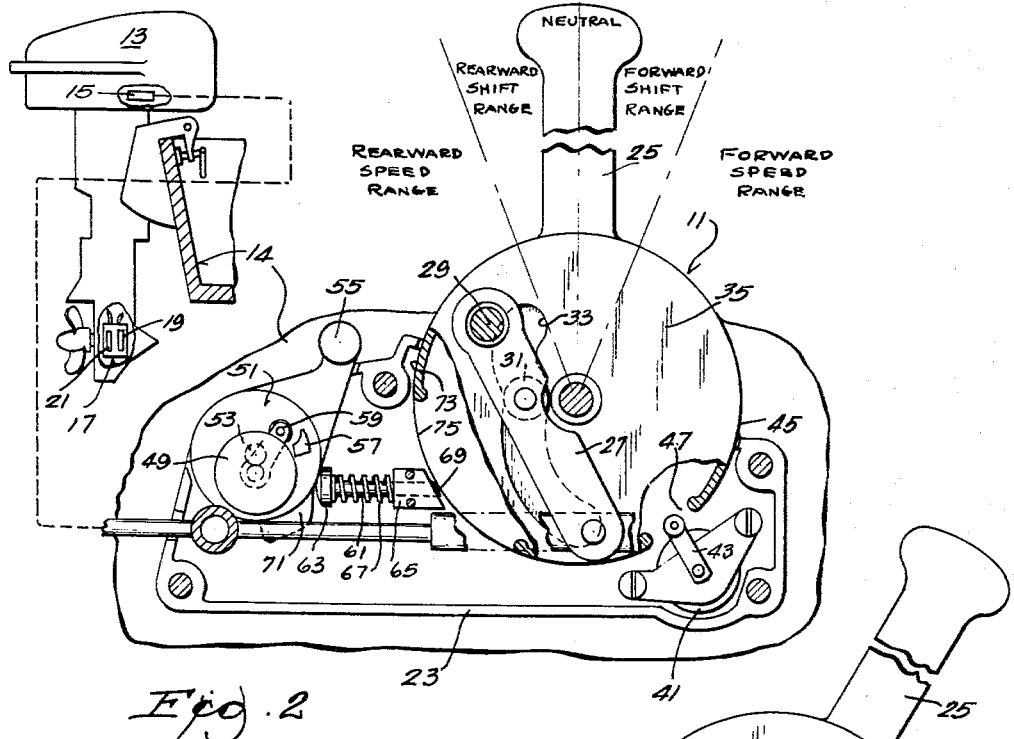
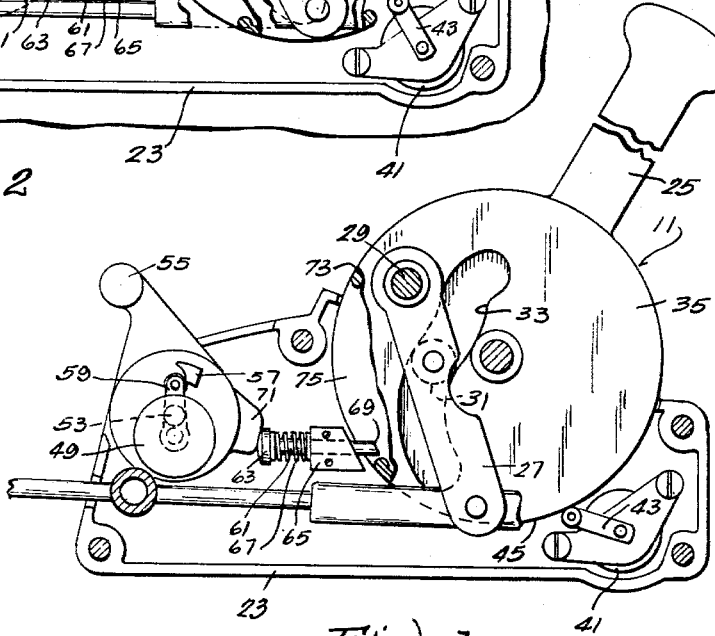
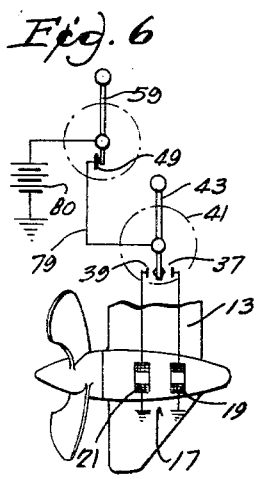
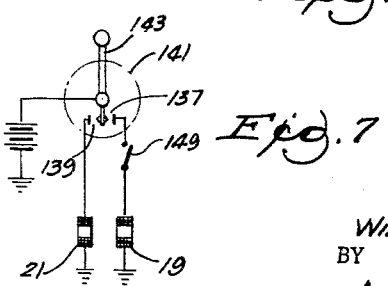
INVENTOR.
WILLIAM J. SHIMANCKAS
BY
Wheeler, Wheeler & Wheeler
ATTORNEYS

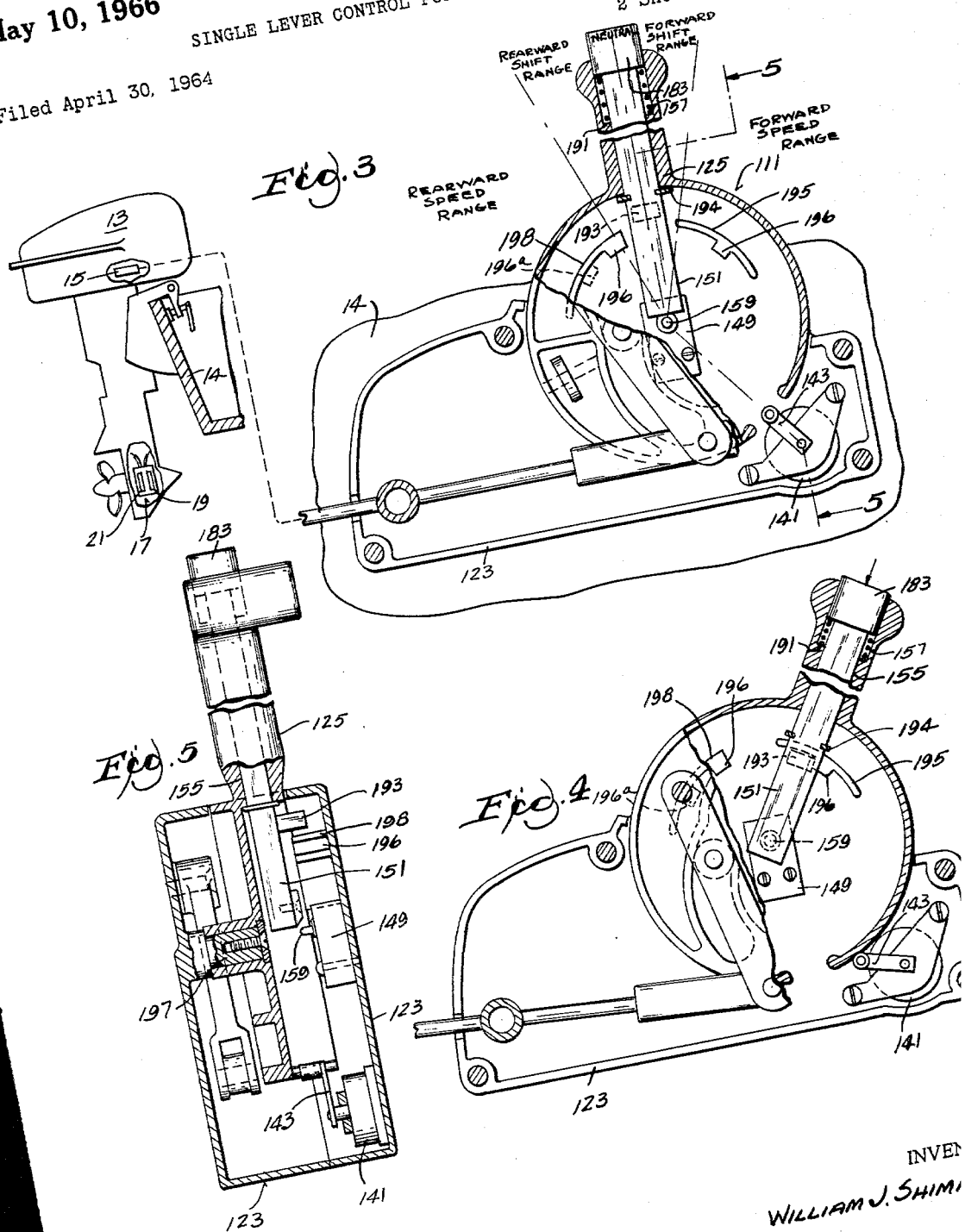

United States Patent Office 3,250,350
Patented May 10, 1966

3,250,350
SINGLE LEVER CONTROL FOR CLUTCH
AND MOTOR
William J. Shimanckas, Waukegan, Ill., assignor to Outboard Marine Corporation, Waukegan, Ill., a corporation of Delaware
Filed Apr. 30, 1964, Ser. No. 363,750
13 Claims. (Cl. 192—.096)

This application is a continuation-in-part of my prior copending application Serial No. 177,018, filed March 2, 1962 and issued on July 6, 1964 as U.S. Patent No. 3,139,767. Reference is also hereby made to my prior copending application Serial No. 181,719, filed on March 22, 1962, now United States Patent No. 3,131,575, issued May 5, 1964, and Serial No. 181,577 filed March 22, 1962, now United States Patent No. 3,131,795, issued May 5, 1964.

The invention relates generally to speed and shift controls for engines such as internal combustion and turbine engines. More particularly, the invention relates to single lever throttle and shift control devices for engines or propulsion drives incorporating an electrically operated shift or clutch means.

Various mechanical arrangements have been employed in the past for shifting an engine without operation of the main control lever and therefore without affecting the setting of an engine clutch as for instance, in order to permit engine warm up. The device disclosed herein provides for throttle advance without shifting the clutch by electrically uncoupling the device from the controlled, electrically operated clutch, i.e., when the clutch is therefore in neutral. The invention disclosed herein also affords throttle advance in neutral in response to movement of the main control lever without shifting the clutch by electrically opening the circuit controlling the engine clutch, whereby such movement of the main control lever which normally serves to activate the clutch is rendered ineffective.

In one embodiment, there is provided an auxiliary control member which coacts with a normally closed switch in a clutch control circuit to open the circuit and therefore permit throttle advancement without affecting the clutch. In this embodiment, there is also provided an arrangement coacting with the auxiliary control member and with the main control lever to limit the amount of throttle advancing movement of the main control lever to a predetermined speed setting when the clutch circuit is deactivated, thereby controlling maximum throttle advance, and to prevent subsequent operation of the auxiliary control member after the main control lever is advanced beyond said predetermined setting.

In another embodiment, a button or other means is carried directly on the main control lever to afford opening of a normally closed switch in the clutch controlling circuit. Also in this embodiment, there is provided cooperating means on the control housing and on the main control lever to maintain the clutch controlling circuit open when the button means is actuated and the main control lever advanced from a low speed setting, to control or limit the amount of throttle advancing movement of the main control lever from its low speed or idle setting, and to prevent operation of the button subsequent to advancement of the main control lever beyond the limit of throttle advance in neutral.

Other objects and advantages of the invention will become known by reference to the following description and the accompanying drawings.

In the drawings:

FIGURE 1 is an elevational view, partially broken away and in section, of one embodiment of a control device incorporating various of the features of the invention. The device is shown in FIGURE 1 arranged for normal operation;

FIGURE 2 is a view similar to FIGURE 1 showing the device providing throttle advance in neutral;

FIGURE 3 is a side elevational view, partially broken away and in section, of a second embodiment of a control device incorporating various of the features of the invention, the device being shown in the normal neutral position;

FIGURE 4 is a view similar to FIGURE 3 showing the device when providing throttle advance in neutral;

FIGURE 5 is a sectional view taken generally along line 5—5 of FIGURE 3;

FIGURE 6 is a wiring diagram illustrating one wiring arrangement in accordance with the invention; and FIGURE 7 is another wiring diagram showing a modified wiring arrangement in accordance with the invention.

The speed and clutch control device 11 illustrated in FIGURE 1 is intended for control of an engine 13 which is shown schematically in mounted condition on the transom of a fragmentarily illustrated boat 14. The engine 13 includes an adjustable throttle 15 and an electrically actuated clutch 17 including a pair of energizable coils 19 and 21 enabling operation of the engine 13 in neutral, in forward drive, and in rearward drive. Forward drive of the engine is provided incident to energizing of the coil 19 and rearward drive is provided incident to energizing of the coil 21. When neither of the coils 19 and 21 is energized, the engine 13 is in neutral. One example of an engine incorporating an electrically operated reversing clutch is fully disclosed in my copending application entitled "Marine Propulsion Device With Electromagnetic Reversing Clutch," Serial No. 143,773 filed October 9, 1961, issued as Patent No. 3,216,392 and assigned to the assignee of this application.

The speed and clutch device 11 includes a frame 23 which can be suitably mounted on the hull of the boat 14. Pivotally mounted on the frame 23 by suitable means is a main control lever 25. The means mounting the main control lever 25 can be as disclosed in my copending application Serial No. 181,719. In operation, the main control lever 25 is movable from a neutral setting through respective forward and rearward shift ranges on opposite sides of the neutral setting and then through respective forward and rearward speed ranges.

Engine throttle control can be accomplished in various ways as shown for instance in my copending applications Serial Nos. 181,719 and 181,577. The specific embodiment shown in FIGURE 1 includes a rocker arm 27 which is mounted to the frame about a stud 29 and which carries a follower 31 engaged in a cam slot 33 in a generally disc shaped lower portion 35 of the main control lever 25, as more fully disclosed in my copending application Serial No. 177,018. The specific details of the arrangement for controlling an engine throttle are unimportant to the broad aspects of the invention.

Clutch control can be afforded by switch means carried on the frame 23 and by switch actuating means carried by the main control lever 25, as disclosed in application Serial No. 177,018. In the specifically disclosed construction, a pair of switches 37 and 39 shown schematically in FIGURE 6 are included in a single housing 41 (see also FIGURE 1) and are operable by a pivotal actuator 43 which is biased by means not shown into a position which normally serves to open both switches 37 and 39. The actuator 43 is operated to selectively close the switches 37 and 39 and to maintain the switches closed in response to movement of the main control lever 25 from its neutral setting by switch actuating means on the control lever in the form of an arcuate flange 45 including means defining an aperture or recess 47 receiving the actuator 43 when the main control lever 25 is in neutral. Accordingly, movement of the actuator 43 from neutral serves to selectively close the switches 37 and 39 and to thereby operate the clutch 17.

Throttle advance in neutral is provided by means including a normally closed switch 49 electrically coupled in series with one or both of the switches 37 and 39 coupled to the coils 19 and 21 of the reversing clutch 17, together with manually operable means in the form of an auxiliary control member 51 for opening the normally closed switch 49. Thus, when the auxiliary control member is located in position opening the switch 49, movement of the main control lever 25 from its neutral setting and consequent closing of the switches 37 and 39 is ineffective to operate the clutch, but does provide throttle advance in response to movement of the main control lever 25 beyond the shift range.

In the specifically disclosed construction shown in FIGURES 1 and 2, the auxiliary control member 51 includes a handle or knob 55 extending exteriorly of the frame 23 and is mounted on the frame 23 by suitable means affording pivotal movement about an axis or pivot 53. Carried by the auxiliary control member is a lug 57 which is engageable with the actuating arm 59 of the switch 49, the switch 49 being suitably mounted on the frame 23. The switch arm 59 is biased by means (not shown) to the position shown in FIGURE 1, thereby closing the switch. However, when the switch arm 59 is moved to the position shown in FIGURE 2, in response to engagement of the lug 57 incident to counterclockwise movement of the auxiliary control member 51, the switch 49 is opened to prevent energizing of one or both of the clutch controlled coils 19 and 21 in response to movement of the main control lever 25 from its neutral setting.

Means are provided for limiting movement of the main control lever 25 from its neutral setting to a predetermined speed setting spaced from the neutral setting and located in the speed range when the auxiliary control member 51 is located to open the normally closed switch 49, thereby limiting advancement of the throttle setting when the engine is in neutral. Means are also provided for preventing movement of the auxiliary control member 51 to the position opening said normally closed switch 49 when the main control lever 25 is located in the speed range beyond the predetermined setting, thereby preventing deenergizing of the clutch 17 and shifting to neutral when the engine is operating above a predetermined speed.

In the specifically disclosed construction, the above mentioned means comprise a plunger 61 including, at one end, a head 63, which plunger 61 is slideably carried in a block 65 for movement along a path between the auxiliary control member 51 and the main control lever 25. Located in encircling relation to the plunger 61 between the block 65 and the head 63 is means in the form of a spring 67 biasing the plunger 61 toward the auxiliary control member 51. When the auxiliary control member 51 is in position affording maintenance of the normally closed condition of the switch 49, the head 63 of the plunger 61 is engaged with the auxiliary control member 51 and the other end 69 of the plunger is located clear of the periphery of the main control lever 25. Coacting with the plunger 61 is a projection 71 on the auxiliary control member 51, which projection 71 serves, incident to movement of the auxiliary control member 51 from the position shown in FIGURE 1 to the position shown in FIGURE 2, to displace the plunger 61 to the right as shown in FIGURES 1 and 2.

The main control lever 25 is provided with means coacting with the plunger 61 in the form of an arcuate surface 73 which is laterally spaced from the operating portions of the flange 45. The surface 73 includes means therein defining a relatively elongated cutout or recess 75 for receiving the other end 69 of the plunger 61 when the plunger 61 is shifted to the right by engagement of the projection 71 on the auxiliary control member 51 as the control member is located in the position opening the switch 49. The means defining the cutout 75 is arranged so as to limit throttle advancing movement of the main control lever 25 to a predetermined speed setting, as shown in FIGURE 2. The cutout can provide for throttle advancing control lever movement to positions in each of the forward and rearward speed ranges or can be limited to provide throttle advance in neutral only in response to control lever movement in either the forward shift and speed ranges or in the rearward shift and speed ranges.

When the auxiliary control member 51 is in position affording maintenance of the closed condition of the switch 49 and when the main control lever 25 is advanced beyond the predetermined speed setting, the surface 73 interferes with plunger movement to the right as shown in the drawings, and thereby prevents movement of the auxiliary control member 51 to its position opening the switch 49. Thus, de-energizing of one or both of the coils 19 and 21 when the engine speed is above a predetermined setting is prevented.

As shown in FIGURE 6, the normally closed switch 49 is interposed in a circuit 79 between a source of energy, such as a battery 80, and the switches 37 and 39 which control current flow to the coils 19 and 21. Opening of the switch 49 thereby serves to prevent energizing of both coils. Alternatively, normally closed switch 47 can be located in one of electrical leads which respectively connect the switches 37 and 39 with the coils 19 and 21. Accordingly, if the switch 49 is in the lead connected to the coil 19 controlling forward drive, operation of the auxiliary control member 51 to open switch 49 serves only to prevent energizing of the coil 19 controlling forward drive. If desired, switch 49 could be located in the lead connecting switch 39 to the coil 21 controlling rearward drive.

FIGURES 3, 4, and 5 disclose a second embodiment of a speed and clutch control device 111 connected to the engine 13. As in the embodiment shown in FIGURES 1 and 2, the control device 111 includes a frame 123, a main control lever 125 pivotally mounted on the frame 123, suitable means operable by the main control lever 125 for operating the engine throttle 15, and suitable switch means including switches 137 and 139 (see FIGURE 7) respectively connected to the coils 19 and 21 of the engine 13 and actuated by means on the main control lever 125.

In the embodiment shown in FIGURES 3, 4, and 5, means mounted at least partially on the main control lever 125 are provided for preventing energizing of one or both of the clutch controlling coils 19 and 21, thereby affording throttle advance in neutral. Specifically, such means includes a normally closed switch 149 mounted on the frame 123 and a member 151 which incorporates a button or portion 183 extending exteriorly of the main control lever 125 and which is movable relative to the switch 149 so as to effect opening of the switch. As in the other embodiment, the switch 149 can be connected in series with one or both of the switches 137 and 139 which are contained in a housing 141 and which are operated by movement of the actuator 143 in response to shifting of the main control lever 125. The switch 149 is shown in FIGURE 7 connected between the switch 137 and the coil 19 controlling forward drive. If desired, the switch can be connected in like manner to the switch 49 shown in FIGURE 6.

More specifically, the member 151 is carried by means in the form of a suitable guideway 155 in the main control lever 125 for movement radially of the stud 197 (see FIGURE 5) about which the main control lever 125 is pivoted. Means are provided for biasing the member 151 radially outwardly. In the disclosed construction, such means is in the form of a spring 157 encircling a portion of the upper end of the member 151 and confined between the button 183 and a seat 191 in the main control lever 125. A cross bar 194 on member 151 limits radially outward movement.

The switch 149 includes an actuator 159 and is mounted with the actuator 159 located in general alignment with the pivotal axis of the main control lever 125, whereby when the button 183 is moved to its depressed position, the actuator 159 is continuously engaged to maintain the switch 149 and associated circuit in open condition notwithstanding movement of the main control lever 125.

Means are provided for limiting the amount of throttle advance permissible when the button 183 is depressed and the clutch 17 is accordingly in neutral, for maintaining the button 183 in depressed condition when the main control lever 125 is shifted from neutral with the button 183 in depressed condition, and for preventing depression of the button 183 after the main control lever 125 is shifted from neutral with the button 183 in its outwardly biased position, thereby preventing shifting of the engine to neutral when the engine throttle 15 is advanced beyond an idle setting.

In the specifically disclosed construction, such means takes the form of a lobe 193 carried by the radially extending member 151 and a pair of arcuate ridges 195 and 198 which are sufficiently spaced to provide passage of the lobe 193 therebetween when the main control lever 125 is in its neutral setting. Engagement of the lobe 193 with the upper surface of each of the ridges 195 and 198 prevents inward shifting of the member 151 after displacement of the main control lever 125 from its neutral setting when the button or member is initially in its outwardly biased position. Engagement of the lobe 193 with the lower surface of the ridge 195 serves to maintain the button 183 and member 151 in depressed condition when the main control lever 125 is shifted forwardly from neutral with the button and member in a depressed condition. Projecting radially inwardly from the lower surface of each ridge is a projection 196 which is engageable with the lobe 193 to limit movement of the main control lever 125 when the member 151 is in its inwardly depressed position, thereby preventing movement of the main control lever rearwardly and limiting the speed setting possible in response to forward movement of the control lever 125. If the switch 149 is located in series with both switches 137 and 139, the projection 196 extending from ridge 198 can be located as shown at 196a to afford limited throttle advancing movement into both the forward and rearward speed ranges.

Various of the features of the invention are set forth in the following claims.

What is claimed is:

1. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement to both sides of a neutral setting, means on said lever for closing said normally open switch means in response to initial movement of said lever from its neutral setting, means connected to said lever and adapted to be connected to an engine throttle for advancing the throttle in response to movement of said lever from its neutral setting, normally closed switch means electrically coupled in series with said normally open switch means, and manually operable means on said frame for opening said normally closed switch means.

2. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement in one direction from a neutral setting, means on said lever for closing said normally open switch means in response to initial movement of said lever in said one direction from its neutral setting, means connected to said lever and adapted to be connected to an engine throttle for advancing the throttle in response to movement of said lever in said one direction from its neutral setting, normally closed switch means electrically coupled in series with said normally open switch means, manually operable means on said frame for opening said normally closed switch means, and means operable by said manually operable means for limiting the amount of movement of said lever from said neutral setting when said normally closed switch means is open.

3. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement to both sides of a neutral setting, means on said lever for closing said normally open switch means in response to initial movement of said lever from its neutral setting, means connected to said lever and adapted to be connected to an engine throttle for advancing the throttle in response to movement of said lever from its neutral setting, normally closed switch means electrically coupled in series with said normally open switch means, manually operable means on said frame for opening said normally closed switch means, and coacting means on said frame, on said lever, and on said manually operable means for preventing switch opening operation of said manually operable means when said lever is located beyond a predetermined distance from said neutral setting on either side of said neutral setting.

4. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement in one direction from a neutral setting, means on said lever for closing said normally open switch means in response to initial movement of said lever in said one direction from its neutral setting, means connected to said lever and adapted to be connected to an engine throttle for advancing the throttle in response to movement of said lever in said one direction from its neutral setting, normally closed switch means electrically coupled in series with said normally open switch means, an auxiliary control member movably mounted on said frame for opening said normally closed switch means, and coacting means on said frame, on said lever, and on said auxiliary control member for limiting movement of said lever from said neutral setting to a predetermined setting spaced in said one direction from said neutral setting when said auxiliary control member is located to open said normally closed switch means and for preventing movement of said auxiliary control member to a position opening said normally closed switch means when said lever is located at a setting located in said one direction beyond said predetermined setting from said neutral setting.

5. A control in accordance with claim 4 wherein said coacting means on said frame comprise a plunger, means mounting said plunger for movement along a path extending between said auxiliary control member and said lever and means biasing said plunger into a position with one end engaged with said auxiliary control member and with the other end clear of said lever, said coacting means on said auxiliary control member comprising a lug engageable with said plunger to displace said plunger toward said lever in response to movement of said auxiliary control member toward said position opening said normally closed switch means, and said coacting means on said lever comprising a surface including means defining an aperture therein to afford receipt of said other end of said plunger when said auxiliary control member is moved to said position and said lever is located between said neutral and predetermined settings, said surface affording interfering engagement with said other end of said plunger to prevent movement of said auxiliary control member to said position when said lever is located at a setting to the other side of said predetermined setting from said neutral setting.

6. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement in one direction from a neutral setting, means on said lever for closing said normally open switch means in response to initial movement of said lever in said one direction from its neutral setting, means connected to said lever and adapted to be connected to an engine throttle for advancing the throttle in response to movement of said lever in said one direction from its neutral setting, normally closed switch means electrically coupled in series with said normally open switch means, and manually operable means mounted on said lever for movement relative to said lever and for opening said normally closed switch means.

7. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement in one direction from a neutral setting, means on said lever for closing said normally open switch means in response to initial movement of said lever in said one direction from its neutral setting, means connected to said lever and adapted to be connected to an engine throttle for advancing the throttle in response to movement of said lever in said one direction from its neutral setting, normally closed switch means electrically coupled in series with said normally open switch means, manually operable means mounted on said lever for movement relative to said lever and for opening said normally closed switch means, and means on said lever and on said frame for limiting movement of said lever from its neutral setting when said normally closed switch means is open.

8. A control device for an engine having a throttle and an electrically controlled clutch means, said device comprising a frame, first electrical switch means on said frame adapted to be electrically connected to the engine clutch means for operation thereof in response to actuation of said first switch means, a lever, means pivotally mounting said lever on said frame for movement in one direction from a neutral setting, means on said lever for actuating said first switch means in response to initial movement of said lever in said one direction from its neutral setting, means connected to said lever and adapted to be connected to an engine throttle for advancing the engine throttle in response to movement of said lever in said one direction from its neutral setting, second switch means electrically coupled in series with said first switch means, manually operable means mounted on said lever for movement relative to said lever and for actuating said second switch means to render said first switch means inoperative, and means on said lever and on said frame for limiting movement of said lever from its neutral setting when said second switch means is actuated.

9. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement to both sides of a neutral setting, means connected to said lever and adapted to be connected to the engine throttle for control thereof, means on said lever for closing said normally open switch means in response to movement of said lever from its neutral setting, normally closed switch means electrically coupled in series with said normally open switch means, a member, and means mounting said member on said lever for movement radially of said means pivotally mounting said lever, said member being operable in response to radially inward movement thereof to open said normally closed switch means.

10. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement relative to a neutral setting, means connected to said lever and adapted to be connected to the engine throttle for control thereof, means on said lever for closing said normally open switch means in response to movement of said lever from its neutral setting, normally closed switch means electrically coupled in series with said normally open switch means, a member, means mounting said member on said lever for radial movement with respect to said lever mounting means, said member being operable in response to radially inward movement thereof to open said normally closed switch means, and means on said member and on said frame for limiting throttle advancing movement of said lever from its neutral setting when said member is disposed radially inwardly so as to open said normally closed switch means.

11. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement relative to a neutral setting, means connected to said lever and adapted to be connected to the engine throttle for control thereof, means on said lever for closing said normally open switch means in response to movement of said lever from its neutral setting, normally closed switch means electrically coupled in series with said normally open switch means, a member, means mounting said member on said lever for radial movement with respect to said lever mounting means between a radially outwardly located position and a radially inwardly located position, said member being operable when in said radially inward position to open said normally closed switch means, and means on said member and on said frame for preventing radially inward movement of said member when said lever is displaced from said neutral setting with said member in said radially outwardly located position.

12. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement relative to a neutral setting, means connected to said lever and adapted to be connected to the engine throttle for control thereof, means on said lever for closing said normally open switch means in response to movement of said lever from its neutral setting, normally closed switch means electrically coupled in series with said normally open switch means, a member, means mounting said member on said lever for radial movement with respect to said lever mounting means between a radially outwardly located position and a radially inwardly located position, said member being operable when in said radially inward position to open said normally closed switch means, and means on said member and on said frame for preventing radially outward movement of said member when said lever is displaced from its neutral setting with said member in said radially inwardly located position.

13. A control device for an engine having a throttle and an electrically controlled clutch means, said device comprising a frame, normally open electrical switch means on said frame adapted to be electrically connected to the engine clutch means for operation thereof in response to switch means closure, a lever, means pivotally mounting said lever on said frame for movement relative to a neutral setting, means connected to said lever and adapted to be connected to the engine throttle for control thereof, means on said lever for closing said normally open switch means in response to movement of said lever from its neutral setting, normally closed switch means electrically coupled in series with said normally open switch means, a member, means mounting said member on said lever for radial movement with respect to said lever mounting means between a radially outwardly located position and a radially inwardly located position, said member being operable when in said radially inward position to open said normally closed switch means, and means on said member and on said frame for preventing radially inward movement of said member when said lever is displaced from said neutral setting with said member in said radially outwardly located position, for preventing radially outward movement of said member when said lever is displaced from its neutral setting with said member in said radially inwardly located position, and for limiting throttle advancing movement of said lever from its neutral setting when said member is in its radially inwardly located position.

References Cited by the Examiner
UNITED STATES PATENTS 3,146,632    9/1964    Irgens _____ 192—96
3,161,075    12/1964    Harning et al.

DAVID J. WILLIAMOWSKY, *Primary Examiner.*